United States Patent
Garber et al.

(10) Patent No.: US 6,897,374 B2
(45) Date of Patent: *May 24, 2005

(54) CONNECTOR APPARATUS AND METHOD FOR CONNECTING THE SAME

(75) Inventors: Richard Stewart Garber, Saint Paul, MN (US); Charles Peter deCler, Stillwater, MN (US); David W. Meyer, Jordan, MN (US)

(73) Assignee: Colder Products Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/698,992

(22) Filed: Oct. 31, 2003

(65) Prior Publication Data

US 2004/0169368 A1 Sep. 2, 2004

Related U.S. Application Data

(63) Continuation of application No. 10/153,361, filed on May 21, 2002, now Pat. No. 6,649,829.
(60) Provisional application No. 60/292,477, filed on May 21, 2001.

(51) Int. Cl.⁷ .................................................. B67D 5/00
(52) U.S. Cl. ............................ 174/47; 137/177; 455/66
(58) Field of Search ........................... 174/47; 137/177, 137/251.1, 798; 455/66

(56) References Cited

U.S. PATENT DOCUMENTS

| | | |
|---|---|---|
| 4,263,945 A | 4/1981 | Van Ness |
| 4,469,149 A | 9/1984 | Walkey et al. |
| 4,846,233 A | 7/1989 | Fockens |
| 4,928,202 A | 5/1990 | Gale et al. |
| 4,934,419 A | 6/1990 | LaMont et al. |
| 5,156,198 A | 10/1992 | Hall |
| 5,249,612 A | 10/1993 | Parks et al. |
| 5,604,681 A | 2/1997 | Koeninger |
| 5,605,182 A | 2/1997 | Oberrecht et al. |
| 5,738,153 A | 4/1998 | Gerling et al. |
| 5,762,118 A | 6/1998 | Epworth et al. |
| 5,857,501 A | 1/1999 | Kelerich et al. |
| 5,913,180 A | 6/1999 | Ryan |
| 5,923,572 A | 7/1999 | Pollock |
| 5,944,069 A | 8/1999 | Nusbaumer et al. |
| 6,050,544 A | 4/2000 | Meronek |
| 6,116,298 A | 9/2000 | Haimovich et al. |
| 6,139,364 A | 10/2000 | Beutler et al. |
| 6,140,146 A | 10/2000 | Brady et al. |
| 6,141,562 A | 10/2000 | Eriksson |
| 6,145,746 A | 11/2000 | Bard et al. |
| 6,147,605 A | 11/2000 | Vega et al. |
| 6,147,606 A | 11/2000 | Duan |
| 6,147,655 A | 11/2000 | Roesner |
| 6,147,662 A | 11/2000 | Grabau et al. |
| 6,209,592 B1 | 4/2001 | Gilboa et al. |
| 6,318,768 B1 | 11/2001 | Gehres |
| 6,347,723 B1 | 2/2002 | Barlian et al. |

FOREIGN PATENT DOCUMENTS

| | | |
|---|---|---|
| EP | 0 943 584 A1 | 9/1999 |
| WO | 99/15458 | 4/1999 |
| WO | 01/03983 A1 | 1/2001 |

*Primary Examiner*—Dean A. Reichard
*Assistant Examiner*—Adolfo Nino
(74) *Attorney, Agent, or Firm*—Merchant & Gould P.C.

(57) ABSTRACT

A connector apparatus for controlling fluid dispensing/transmission that includes a control component for communication between couplers thereof. A first coupler has a transmitter, and is releasably connected with a mating reader coupler that has a transmitter and fluid control device to exchange information with the transmitter of the first coupler. The transmitters communicate and are operated by wireless means such as by RF devices. Upon confirming that the first coupler is properly coupled to the mating coupler and that the first coupler has a proper identification, the fluid control device controls fluid flow, using the transmitters of the first coupler and the mating reader coupler, under predetermined parameters, e.g., pressure, temperature, duration, and flow rate, as indicated in the first coupler.

17 Claims, 10 Drawing Sheets

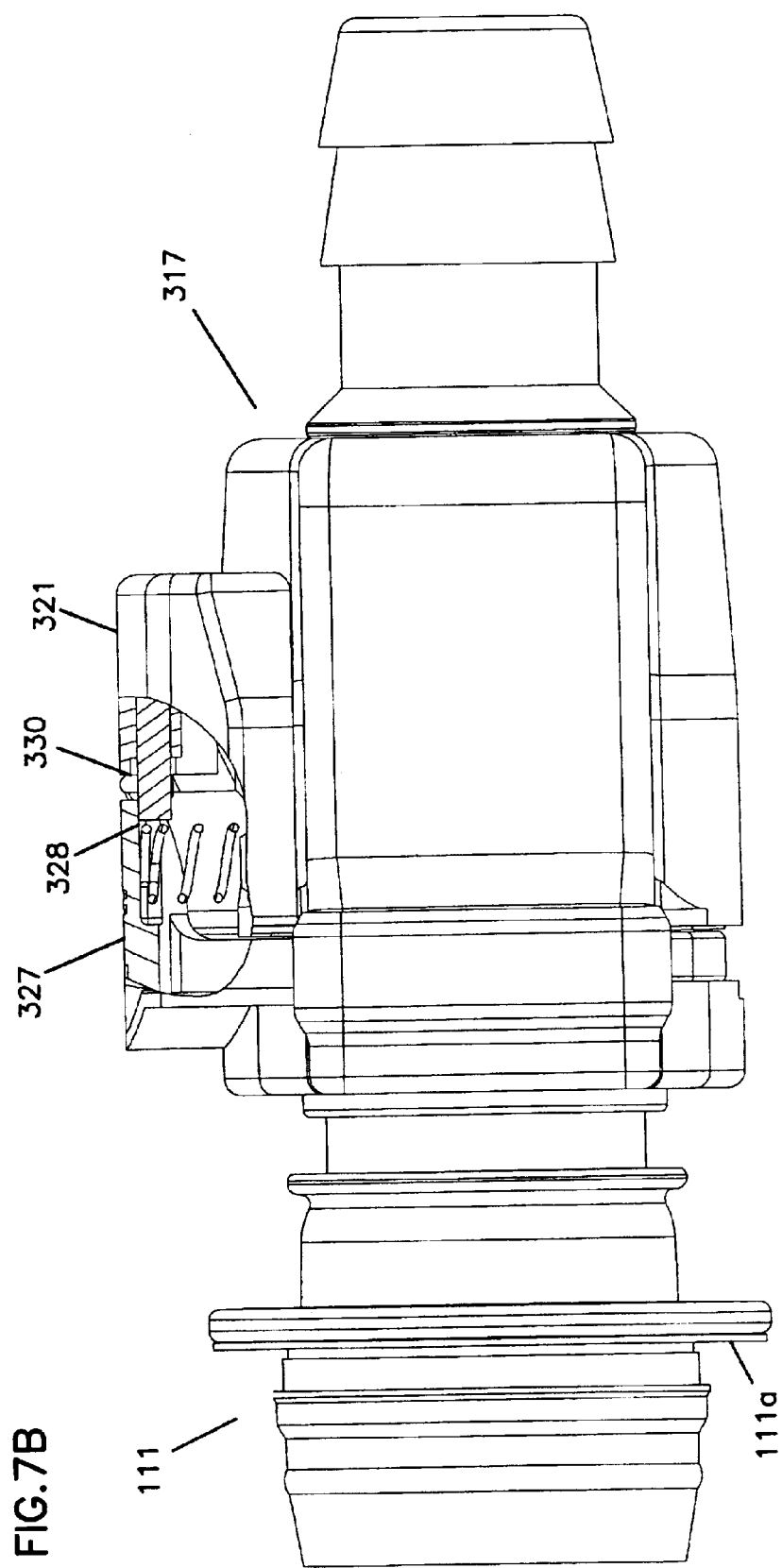

CONNECTOR APPARATUS AND METHOD FOR CONNECTING THE SAME

This application is a continuation of U.S. Nonprovisional application Ser. No. 10/153,361, filed on May 21, 2002 now U.S. Pat. No. 6,649,829, entitled Connector Apparatus and Method for Connecting the Same for Controlling Fluid Dispensing, which claimed benefit of U.S. Provisional Application Ser. No. 60/292,477, filed on May 21, 2001, entitled Control System Having RF Coupler and Method Thereof, both of which are in their entireties incorporated herewith by reference.

FIELD OF THE INVENTION

The present invention relates to a connector apparatus and method for connecting a fluid coupler set for controlling fluid dispensing and fluid transmission. More specifically, the present invention relates to a Radio Frequency (RF) control system incorporated with a connector apparatus having a fluid coupler set with radio-frequency-identification (RFID) circuitry for monitoring and/or controlling fluid dispensing and fluid transmission.

BACKGROUND OF THE INVENTION

Typically, conventional fluid connectors used for fluid dispensing or fluid transmission have a fluid coupling assembly with a first end connected to a fluid source and a second end connected to a fluid system including a fluid line. The coupling assembly normally comprises a male coupler and a corresponding female coupler for receiving the male coupler. The male coupler or the female coupler further includes a mechanical latch for latching/unlatching the male coupler and the female coupler in a coupled/uncoupled state. To place the coupling assembly in the connected state, the male coupler is inserted into one end of the female coupler, with a seal member extending therebetween to create a fluid tight seal. Accordingly, the male coupler and the female coupler define a passageway for fluid flow therethrough when the coupling assembly is in the connected state.

However, these fluid connectors cannot distinguish one mating coupler from another. The conventional female coupler, for example, cannot distinguish between mating male couplers that are unique with respect to the date and/or origin of manufacture, fluid compatibility, ownership, that are proprietary, or any other characteristic pertinent to the control of fluid flow through connectors. Further, such fluid connectors do not provide a reliable structure and configuration for communication between the coupling halves in recognizing a positive connection therebetween within a desired range and for subsequent communication to control fluid flow. Furthermore, existing devices do not provide a way to prevent misconnection between mismatched coupling halves in preventing product contamination.

Thus, there is a need for an improved connector apparatus for fluid dispensing that can identify or distinguish different couplers, and further to enable control connection between coupling halves and control of fluid dispensing and transmission. Furthermore, there is a need for a reliable fluid control system that is simplified and cost effective.

SUMMARY OF THE INVENTION

To overcome the limitations of the related art described above, and to overcome other limitations that will become apparent upon reading and understanding the present specification. This invention is directed to a connector apparatus for controlling fluid dispensing and/or fluid transmission.

One embodiment of a connector apparatus includes a fluid transfer line into which suitable coupling halves are releasably connected; the first of the coupler halves having a first transmitter and the second coupling half equipped with a second transmitter. Preferably, the first and second transmitters communicate by wireless means. More preferably, the first and second transmitters are constructed and arranged so as to communicate when the first and second couplers are at least partially connected in a pre-coupled position.

In one embodiment of the connector apparatus, the first and second transmitters are mounted on the first and second couplers, respectively.

In one embodiment of the connector apparatus, the transmitter on the first coupler is a radio frequency (RF) device attached on the first coupler. The second coupler is releasably connected with the first coupler, and the transmitter on the second coupler is an RF device mounted on the second coupler. Preferably, the RF device on the first coupler is a radio frequency identification (RFID) tag (referred to as RF coupler hereafter) and the RF device on the second coupler includes a data communication module (referred to as reader coupler hereafter).

Preferably, a fluid control device (referred to as process equipment hereafter) is operatively connected with the second coupler. The process equipment includes means for directly or remotely enabling or terminating the flow of fluid through the coupling halves and the fluid transfer line by signal transmission through the first transmitter and the second transmitter.

Preferably, the process equipment is in communication with the RF device on the second coupler, and the process equipment enables or disables fluid flow through the first coupler (RF coupler), the second coupler (reader coupler), and the fluid transfer line. The first and second couplers are in communication through their respective RF devices. The first coupler transmits and receives signals from the second coupler, and the second coupler transmits and receives signals from the first coupler and the process equipment. The process equipment transmits and receives signals to and from the second coupler.

In one embodiment of the connector apparatus, signal communication in determining proper connection between a first and a second coupler is designed such that the couplers communicate through their RF devices when in close proximity. Preferably, the first and second couplers are positioned in close proximity for communication therebetween such that the first and second couplers are in the pre-coupled position where connection is initiated. More preferably, the pre-coupled position is such that the end faces of the couplers are at least partially connected where further engagement of the coupling halves initiates interlocking between the couplers in a coupled state. The first and second couplers are enabled for connection when a positive signal is communicated between the first and second couplers for a confirmed match.

In one embodiment, the second or reader coupler includes a short range circuit. Preferably, the short range circuit includes an operating range of less than 5 cm, such that the second coupler can effectively communicate with the first coupler when the couplers are at least partially connected in the pre-coupled state described above. Preferably, the short range reader circuit includes a single operating frequency. More preferably, the short range circuit includes a single operating frequency being least 13 MHz thereby enabling the use of a low powered reader circuit.

In one embodiment, the process equipment is operatively connected with a flow governing device that is mounted to the fluid transfer line, where the flow governing device is controlled by the process equipment through signal communication between the transmitters on the first and second couplers to enable or disable fluid flow and control fluid flow conditions. In one embodiment, the flow governing device is incorporated with the second or reader coupler for controlling fluid flow at the point of connection between the first and second couplers in the connector apparatus. That is, the reader or second coupler also acts as the flow governing device, manipulated either directly from the data communication module or indirectly from the process equipment.

In one embodiment the second coupler includes a lock out device mounted thereon. The lock out device is constructed and configured to prevent misconnection of the second coupler to an incorrect first coupler. Preferably, the lock out device is a releasable electromechanical lock device manipulated by a control system based on information from the RF communication between the first and second couplers when the first and second couplers are in the pre-coupled position.

Preferably, the first coupler is in fluid communication with the second coupler when the first coupler and the second coupler are connected together. The first coupler may be suitably connected with a fluid source and the second coupler may be suitably connected with a fluid line.

In one embodiment, a system for controlling fluid dispensing and transmission includes a connector apparatus having a first RF coupler that is releasably connected to a cooperating coupler being a second reader coupler. Preferably, the RF coupler is connected with a fluid source, and the reader coupler is connected to a fluid transfer line. A process equipment is operatively connected with a flow governing device that is attached to and in fluid communication with the fluid transfer line. The reader coupler communicates via RF with the RF coupler, and the data polled from the RF coupler by the reader coupler is transmitted to the process equipment by the reader coupler. Preferably, the RF coupler and the reader coupler are connected in a pre-coupled position to initiate signal communication between the couplers for identification and positive connection. If a connection between the RF coupler and reader coupler is recognized, the process equipment interprets the data, manipulates the flow governing device, and fluid flow from the fluid source is enabled or disabled accordingly. In one embodiment, the process equipment may return data to the reader coupler which, in turn, communicates with the RF coupler to modify or add to the data stored in the RFID integrated circuit (IC) of the RF coupler.

In another embodiment, a method of controlling fluid dispensing through connectors in a fluid transfer line includes providing a connector apparatus having an RF coupler, a reader coupler with a data communication module mounted on the reader coupler, and a process equipment in communication with the RF coupler through the data communication module of the reader coupler. The RF coupler and reader coupler are connected in line and are in fluid communication with the fluid transfer line. The RF and reader couplers can be releasably connected with one another. The RF coupler and reader coupler are positioned in close proximity, such that the couplers are at least partially connected in a pre-coupled state to initiate communication between the RF and reader couplers.

The RF coupler is powered up by transmitting a signal from a reader circuit mounted on the reader coupler to the RF coupler. The RF coupler transmits a reply signal, which includes identification information contained in an RFID tag of the RF coupler, from the RF coupler to the reader coupler. The reply signal is transmitted to the process equipment through the reader coupler. The process equipment interprets the reply signal received, and identifies the RF coupler interrogated by the reader coupler to enable or disable connection. Further, based on the identity of the RF coupler, the process equipment manipulates a flow governing device disposed on the fluid transfer line to enable or disable fluid flow or control fluid flow parameters through the RF coupler, reader coupler, and fluid transfer line.

Preferably, the reader circuit of the reader coupler operates at a single frequency. More preferably, the operating frequency is at least 13 MHz.

In one embodiment, the step of the process equipment manipulating a flow governing device includes incorporating the flow governing device on the reader coupler at the point of connection between the RF coupler and the reader coupler to control fluid flow.

In one embodiment, the step of at least partially connecting the RF coupler and reader coupler includes locking out the reader coupler to prevent misconnection with an incorrect RF coupler. Preferably, a lock out device is controlled by a control system through the RF communication between the RF coupler and the reader coupler in the pre-coupled state. More preferably the lock out device is controlled by the process equipment.

Among other advantages, the connector apparatus includes RF devices on the coupling halves that can be in close proximity with each other. This configuration can allow for less power to be necessary for transferring signals, as well as the minimization of the possible outside interference during signal transfer. Yet another advantage of a close proximity RF system, and especially a short range reader circuit, is that circuitry normally necessary to detect and manage the simultaneous response of multiple RF signals emanating from individual tags may be eliminated. Furthermore, the connector apparatus enables for reliable communication between the couplers, as the couplers are constructed and configured such that RF communication occurs when the couplers are in a pre-coupled position. A lock out device provides a structure so as to prevent misconnection between a reader coupler and an incorrect RF coupler thereby preventing contamination between mismatched lines. In addition, materials can be used that are both cost effective and simplified. Accordingly, the present invention provides improvements to a fluid flow control system.

These and other various advantages and features of novelty, which characterize the invention, are pointed out in the following detailed description. For better understanding of the invention, its advantages, and the objects obtained by its use, reference should also be made to the drawings which form a further part hereof, and to accompanying descriptive matter, in which there are illustrated and described specific examples of an apparatus in accordance with the invention.

BRIEF DESCRIPTION OF THE DRAWINGS

FIG. 7b represents a side partial sectional view of the second coupler of FIG. 7a having the lockout device incorporated therewith in a locked out position.

DETAILED DESCRIPTION OF THE PREFERRED EMBODIMENT

In the following description of the specific embodiments, reference is made to the accompanying drawings which form a part hereof, and in which is shown by way of illustration the specific embodiments in which the invention may be practiced. It is to be understood that other embodiments may be utilized as changes may be made without departing from the scope of the present invention.

This invention provides a connector apparatus with an incorporated control component (i.e., transmitter components used therein) for controlling connection between coupling halves of the connector apparatus and for controlling fluid dispensing and transmission through the connector apparatus. Preferably, the transmitters communicate through wireless means. It will be appreciated the connector apparatus may be incorporated with a fluid source and fluid line for fluid dispensing in a fluid dispensing system or incorporated along a fluid transfer line.

Figure 1:
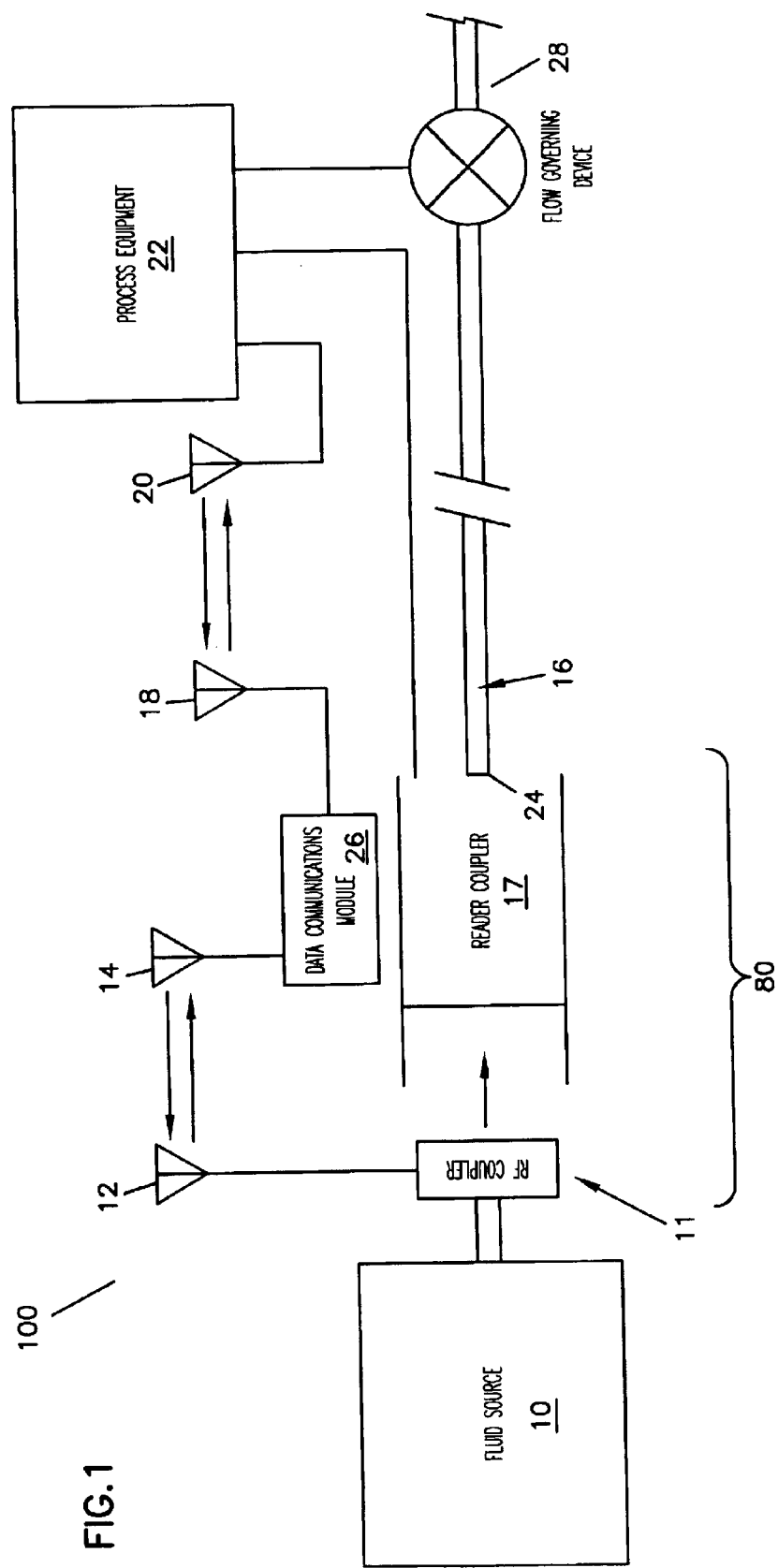
FIG. 1 represents a schematic diagram of one embodiment of a system for controlling fluid dispensing and transmission in accordance with the principles of the present invention.

Referring now to the drawings, FIG. 1 shows a connector apparatus 80 incorporated in a fluid dispensing system 100 controlled using RF means according to one preferred embodiment of the present invention. An RF coupler 11 including a first transmitter with an embedded antenna 12 is attached to a fluid source 10. The fluid source 10 may be any suitable container for holding fluid and allowing attachment with a coupler, such as coupler 11. A cooperating coupler 17 or reader coupler is releasably connectable with the RF coupler 11, and is associated with a fluid transfer line 16, such as a hose.

The reader coupler 17 connects proximate a first end 24 of the fluid transfer line 16. The RF coupler 11 may be a disposable or reusable coupler having a radio frequency identification device (RFID) attached onto the RF coupler 11, i.e., a transponder or a tag, to identify the RF coupler 11 and to transmit/receive information. The RF coupler 11 transmits and receives information to and from a second transmitter disposed on the reader coupler 17.

The RF coupler 11 and reader coupler 17 communicate through the antennas 12, 14. Preferably, communication between the transmitters on the RF coupler 11 and the reader coupler 17 is enabled when the couplers are in close proximity. More preferably, the RF and reader couplers 11, 17 are positioned in a pre-coupled position (as best shown. in FIG. 5b in couplers 111 and 117), where the couplers are at least partially connected or engaged. More particularly, the faces of the RF coupler 11 and reader coupler 17 are oriented and positioned coaxially in an end to end alignment, such that further engagement of the coupling halves initiates interlocking. In the pre-coupled position, the RF coupler 11 and reader coupler 17 resemble a one to one relationship at a single time such that the reader coupler is prevented from connecting and communicating with another coupler unless the RF coupler 11 is removed from the pre-coupled position a distance away from the reader coupler 17. The second transmitter includes a data communication module 26 mounted on the reader coupler 17. The data communication module 26 of the reader coupler 17 may include a short range, low power circuit further described below.

In this configuration, the read range of the reader coupler is defined such that the reader coupler communicates with the RF coupler when an intended interconnection of the couplers is pending, thereby ignoring other local couplers with RFID tags that are not being connected with the reader coupler. Particularly, communication between coupling halves is constructed and arranged where a reader coupler, such as 17, 117 communicates with a respective RF coupler one at a time.

More preferably, the circuitry of the reader coupler is tuned to have a maximum communication range equivalent to a pre-coupled axial separation distance of the reader coupler and RF coupler. It will be appreciated the circuitry of the reader coupler can be tuned to an appropriate read range or communication distance by varying factors such as but not limited to antenna size, antenna configuration and the power of the RF emission. Furthermore, it will be appreciated the communication distance may vary according to physical constraints of the coupler, such as coupler size. For instance, larger couplings requiring greater engagement also may require longer communication distances, such as, fluid couplings equipped with double acting flow shut off valves.

Preferably, the short range, low power circuit is intended for reading/writing at a distance of less than 5 cm between the reader coupler 17 and the RF coupler 11. More preferably, the short range circuit is intended to operate at a distance of 4–5 cm. The short range low power circuit includes a single operating frequency. Preferably, the short range circuit of the data communication module 26 includes a single operating frequency of at least 13 MHz.

Figure 2:
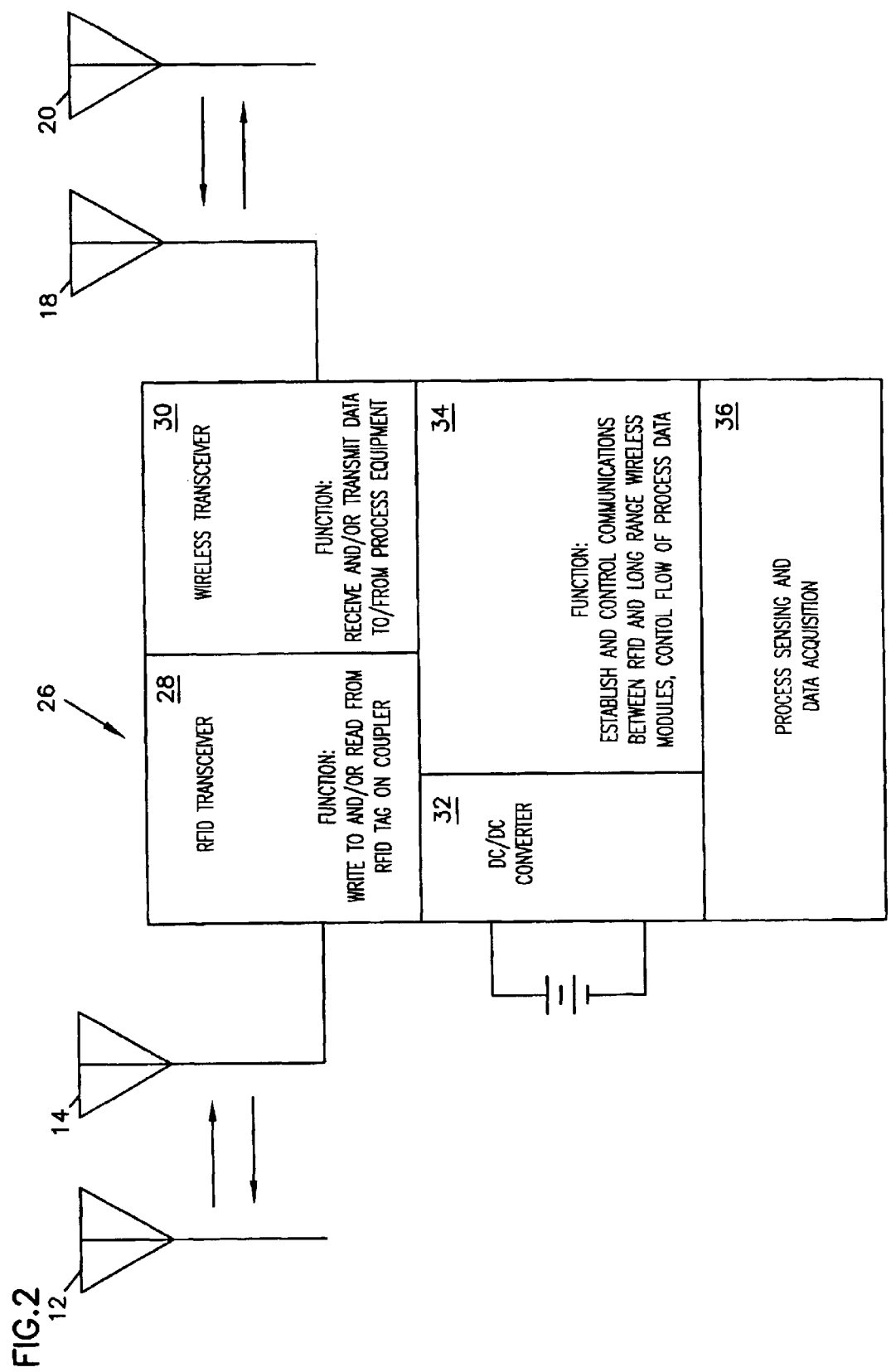
FIG. 2 represents a block diagram of one embodiment of a read/write transmitter device for a second coupler in accordance with the principles of the present invention.

When the couplers are properly positioned and within the desired communication range, the data communication module 26 transmits/receives information to/from the process equipment 22, so as to establish information exchange between the RF coupler 11 and the process equipment 22. As shown in FIG. 2, a flow governing device 38 is connected proximate a second end 28 of the fluid transfer line 16, and is operatively connected with and in communication with the process equipment 22. It will be appreciated the flow governing device 38 also may be disposed at different positions along the fluid transfer line 16 and may be incorporated at the reader coupler 17.

The RF coupler 11 is powered up by transmitting a signal from the reader circuit mounted on the reader coupler 17 to the RF coupler 11. The RF coupler 11 transmits a reply signal, which includes identification information contained in an RFID tag of the RF coupler 11, from the RF coupler 11 to the reader coupler 17. The reply signal is transmitted to the process equipment 22 through the reader coupler 17. The process equipment 22 interprets the reply signal received, and identifies the RF coupler 11 interrogated by the reader coupler 17 to indicate whether the RF coupler and the reader coupler 17 are matched for a positive connection. Further, based on the identity of the RF coupler, the process equipment manipulates the flow governing device 38 disposed on and within the fluid transfer line 16 to enable or disable fluid flow and/or control fluid flow parameters through the RF coupler 11, reader coupler 17, and fluid transfer line 16.

The process equipment 22 manipulates the flow governing device 38 thereby enabling or disabling fluid flow through the RF coupler 11, reader coupler 17, and fluid transfer line 16 from the fluid source 10. It is to be understood that the flow governing device 38 may be any suitable device that may be enabled or disabled, for example an electromechanical device including but not limited to a solenoid, valve, or pump. Further, it will be appreciated that the flow governing device may be incorporated and/or integral with the reader coupler 17, such that the reader coupler acts as the flow governing device 38, and is manipulated either directly from the data communication module 26 or indirectly from the data communication module 26 through the process equipment 22 (as best shown in FIG. 7).

The data communication module 26, as shown in FIG. 2, includes: a RFID transceiver 28 for writing to and/or reading from the RFID tag or transmitter attached to the RF coupler 11, a transceiver 30 (such as a wireless transceiver, or other RF protocol transceiver or physical connection) for receiving and/or transmitting data from/to process equipment 22, a DC/DC converter 32 for power supply, a microcontroller 34, and a process sensing and data acquisition module 36. Preferably, the transceiver 30 is a bluetooth wireless transceiver. As above, the data communication module 26 mounts onto the reader coupler 17, such that when the RF coupler 11 and the reader coupler 17 are at least partially connected in a pre-coupled position, the RF capabilities of both the RF coupler 11 and the data communication module 26 of the reader coupler 17 are in close proximity enabling communication between the RF coupler and reader coupler through antennas 12, 14.

As above, when the RF coupler 11 is pre-coupled with the reader coupler 17, antenna 14 transmits signals to antenna 12, the signals are used to power up the RF coupler 11 including, for instance, an RFID tag on the RF coupler 11, thereby enabling processing of the signals by the RFID tag, and the RFID tag modulates the RF field, using antenna 12, to transmit a reply signal that is received by antenna 14 of the reader coupler 17. As above, the RFID tag is attached onto the RF coupler 11, and the data communication module 26 is mounted on the reader coupler 17. As above, it will be appreciated the circuitry of the reader coupler can be tuned to an appropriate read range or communication distance by varying factors such as but not limited to antenna size, antenna configuration and the power of the RF emission. Furthermore, it will be appreciated the communication distance may vary according to physical constraints of the coupler, such as coupler size. It is preferred the antenna and tag size are constructed and arranged so as to be compact and suitable for couplers having ⅛ to 3 inch diameter in size.

As described above, the data communication module 26 of the reader coupler 17 includes a short range circuit. Preferably, identification of the first coupler 11 and communication between the RFID tag and data communication module 26 of the couplers 11, 17 takes place when the couplers 11, 17 are at least partially connected in a pre-coupled position. More particularly, the faces of the RF coupler 11 and reader coupler 17 are oriented and positioned coaxially in an end to end alignment, such that further engagement of the coupling halves initiates interlocking. In the pre-coupled position, the RF coupler 11 and reader coupler 17 resemble a one to one relationship at a single time such that the reader coupler 17 is prevented from connecting and communicating with another coupler unless the RF coupler 11 is removed from the pre-coupled position a distance away from the reader coupler. This configuration with the RFID tag and the data communication module 26 attached onto the couplers 11 and 17, respectively, allows for the RF devices on the couplers to communicate in close proximity with each other when the couplers 11, 17 are at least partially engaged. Moreover, advantages can be realized in accordance with this configuration, such as, the need for less power to transfer signals and minimization of the possible outside interference during information transfer.

It will be appreciated that wireless means other than RF technology may also be employed. For instance, other known wireless means such as infrared technology may also be used.

As above, the reader circuit is preferably a short range, low power circuit intended for reading/writing at a distance of less than 5 cm between the reader coupler 17 and the RF coupler 11. More preferably, the short range circuit is intended to operate at a distance of 4–5 cm. The short range low power circuit includes a single operating frequency. Preferably, the short range circuit of the data communication module 26 includes a single operating frequency of at least 13 MHz. A higher frequency of at least 13 MHz enables the use for a low power reader circuit.

Preferably, the RF signals are transmitted at a single radio frequency of 13.56 MHz. The RFID tag information may include specific information for properly connecting couplers in a dispensing system, i.e., codes to identify the coupler, its mode of operation, and security markings to prevent unauthorized use. For example, the RFID tag information may include some or all of the following data: 1) Manufacturing date—The coupler has a limited usage time from manufacture, and thus the process equipment and associated flow governing device would not be enabled to allow fluid flow if the RF coupler is out of date. 2) Expiration date—The process equipment and associated flow governing device would not be enabled to allow fluid flow if the RF coupler passed the expiration date. 3) Single use/Reuse information—Whether the coupler is designed to be disposable or reusable. 4) Single use information—If the RF coupler has been used, the tag would be rewritten to indicate such information. Any subsequent attempts to reuse the coupler would be recognized by the process equipment and the flow governing device would not be enabled. 5) Limited multiple reuse—The process equipment would automatically count the number of use cycles, and may rewrite the tag with this information. Thus, when the designed number of use cycles has been reached, the flow governing device would not be enabled.

It is understood that the above features could vary, especially technology advances would cause some block functions shown in FIGS. 1 and 2 to be merged with others. Similarly, it is understood that the positions of the RF coupler 11 and reader coupler 17 relative to the direction of fluid flow may vary according to the functionality required. More specifically, in select applications it may be appropriate to position the reader coupler on the source/supply side of the fluid circuit with corresponding changes to the system schematic.

Upon receiving the RFID tag information, the transceiver 28 communicates with transceiver 30 controlled by microcontroller 34. The microcontroller 34 not only establishes and controls communications between the RFID transceiver 28 and the wireless transceiver 30, but also controls the flow of process data. Then, the information received from the RFID tag on the RF coupler 11 would be transmitted from antenna 18 of the transceiver 30 to the process equipment 22 via antenna 20. Communication between the process equipment 22 and the data communication module 26 may be at a long range. The transceiver 30 could be a wireless transceiver or other RF protocol transceiver or a physical wireline connection. Preferably, the information is transmitted between the transceiver 30 and the process equipment 22 at a radio frequency (for example, 2.4 GHz). Even though FIG. 2 shows a wireless link between the data communication module 26 and the process equipment 22, it is appreciated that a physical hardwired link also can be established therebetween.

When the process equipment 22 receives the information from the data communication module 26, it processes the information to identify the RF coupler 11, and to manipulate the flow governing device 38 according to the information transmitted by the RFID tag of the RF coupler. If the RF coupler 11 has a proper identification, then the process equipment 22 would manipulate the flow governing device 38 to enable fluid transfer. Otherwise, the process equipment 22 would maintain the flow governing device 38 in a disabled position.

In addition, the process equipment 22 may control fluid flow under particular parameters, such as but not limited to pressure, temperature or flow rate, etc., as indicated in the information of the RFID tag of the RF coupler 11. The process equipment 22 also may modify some information of the RFID tag to update the information stored in the RFID tag. For example, the process equipment 22 modifies single use information to prevent further re-use of the RF coupler 11 upon reconnection with the fluid dispensing system 100. Such modified information is first transmitted to the transceiver 30, and then upon communicating with the RFID transceiver 28 via microcontroller 34, it is written into the RFID tag attached to the RF coupler 11.

The process sensing and data acquisition module 36 mounted in the data communication module 26 is used to measure the fluid flow parameters such as pressure, temperature, pH value, flow rate, and provides the corresponding electrical signals, so that the process equipment 22 can receive confirmation of the fluid flow parameters, as indicated on the RFID tag of the RF coupler.

Figure 3:
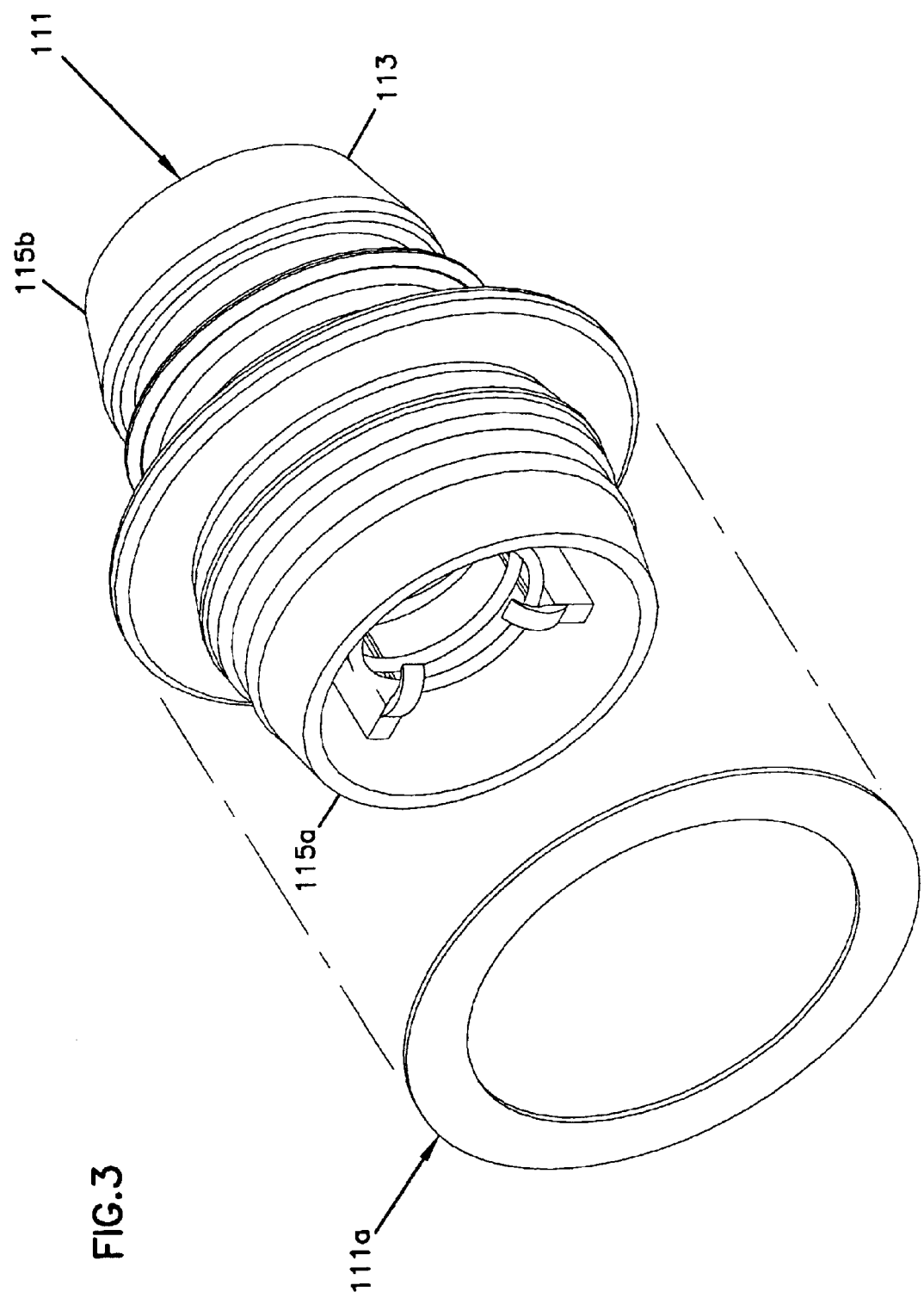
FIG. 3 represents an exploded view of one embodiment of a first coupler having one embodiment of a transmitter attached thereto in accordance with the principles of the present invention.

FIGS. 3–5c illustrate preferred embodiments for a first coupler, a second reader coupler, and a first coupler and second coupler being connected together, respectively. FIG. 3 illustrates a first coupler 111 in exploded relationship. The first coupler may be suitably adapted to connect with a fluid source, such as fluid source 10 at a first end 115a, and may be suitably adapted to connect with a fluid line, such as fluid transfer line 16, through coupling with a second coupler at a second end 115b. Preferably, the second end includes a tapered surface adaptable for connection with a second coupler, such as a conventional quick connect/disconnect coupler.

The first coupler 111 includes a first transmitter 111a. As shown in FIG. 3, the first transmitter 111a is disposed about an outer surface of the first coupler 111. Preferably as above, the first transmitter 111a is a transponder or tag storing identification and operation information respective to the first coupler 111, and includes an antenna embedded therein. More preferably, the first transmitter 111a represents an annular ring. The annular ring shape of the antenna creates a toroidal magnetic field. It will be appreciated that the first transmitter 111a may be disposed at other positions on the first coupler 111, and may be constructed and arranged of different shapes and sizes.

It also will be appreciated that the first transmitter 111a may be arranged and constructed as a thin film molded onto the coupler 111 using an antenna incorporated therewith, such as antenna 12, to transmit signals. A battery source (not shown) could be mounted on the coupler 111 to provide a power source for operation. It will be appreciated the tag 111a may be a magnetic member such as a magnetic stripe or magnetic polymer or a barcode which stores the identification information respective to the coupler. Further, it will be appreciated that other wireless technologies, for instance infrared technology, may be implemented.

Figure 4:
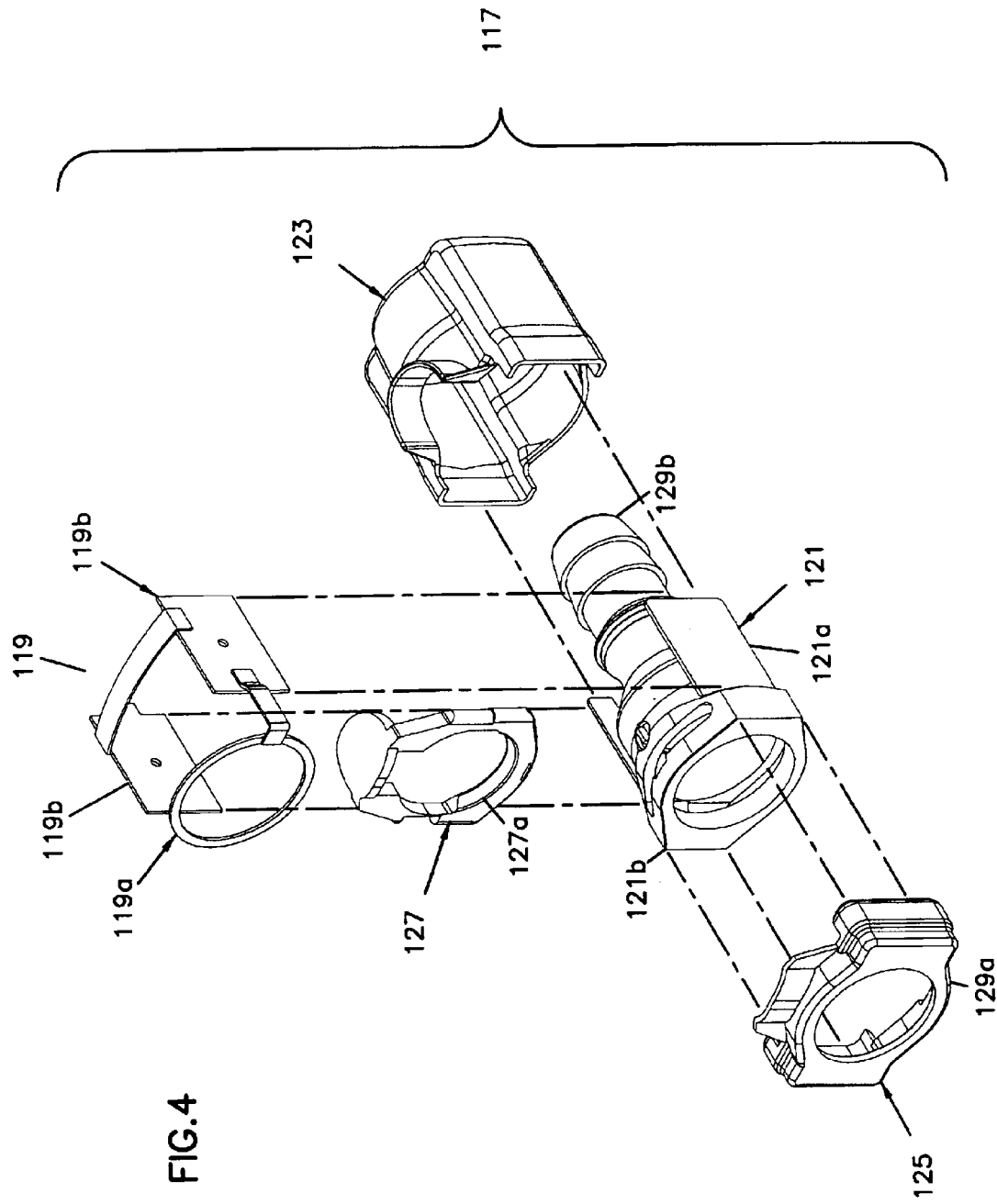
FIG. 4 represents an exploded view of one embodiment of a second coupler having a read/write transmitter incorporated therewith in accordance with the principles of the present invention.

FIG. 4 illustrates a second coupler 117. The second coupler 117 includes a second transmitter 119. It will be appreciated that the second coupler is suitably adapted at a first end 129a for connection with a mating coupler, such as first coupler 111 or RF coupler 11. Further, it will be appreciated that the second coupler 117 is suitably adapted at a second end 129b for connection with a fluid line, such as the fluid transfer line 16.

Preferably, the second transmitter 119 is an RF device that includes at least one circuit board 119b including the short range circuit described above. The second transmitter 119 is arranged and constructed such that it is mounted on second coupler 17. Preferably, the second transmitter 119 uses an antenna 119a to transmit signals. Preferably, the antenna represents an annular ring. The annular ring shape of the antenna creates a toroidal magnetic field. It will be appreciate other sizes, shapes and configurations also may be employed. As shown in FIG. 4, the second coupler 117 includes two circuit boards 119b mounted on two sides of the reader coupler 117. It will be appreciated that this configuration is merely exemplary, and other configurations may be employed where the position and number of circuit boards may be modified. The circuit boards 119b may be hardwired to a power source (not shown). It will be appreciated that other power sources, such as a battery (not shown), may also be employed.

In assembly, the second transmitter 119 includes a body 121 with side surfaces 121a and an end 121b that enable mounting of the second transmitter 119. A shroud 123 and cap 125 cover the body 121 having the second transmitter 119 mounted on the body 121. A latch 127 is disposed between the antenna 119a, which is adjacent with the end 121b of the body, and the cap 125. The latch 127 provides a means for securing the second coupler 117 to a mating first coupler, such as couplers 11, 111. Preferably, the latch 127 is moveable within the body 121 in a direction transverse to the longitudinal flow path of the coupler 117.

Figure 5A:
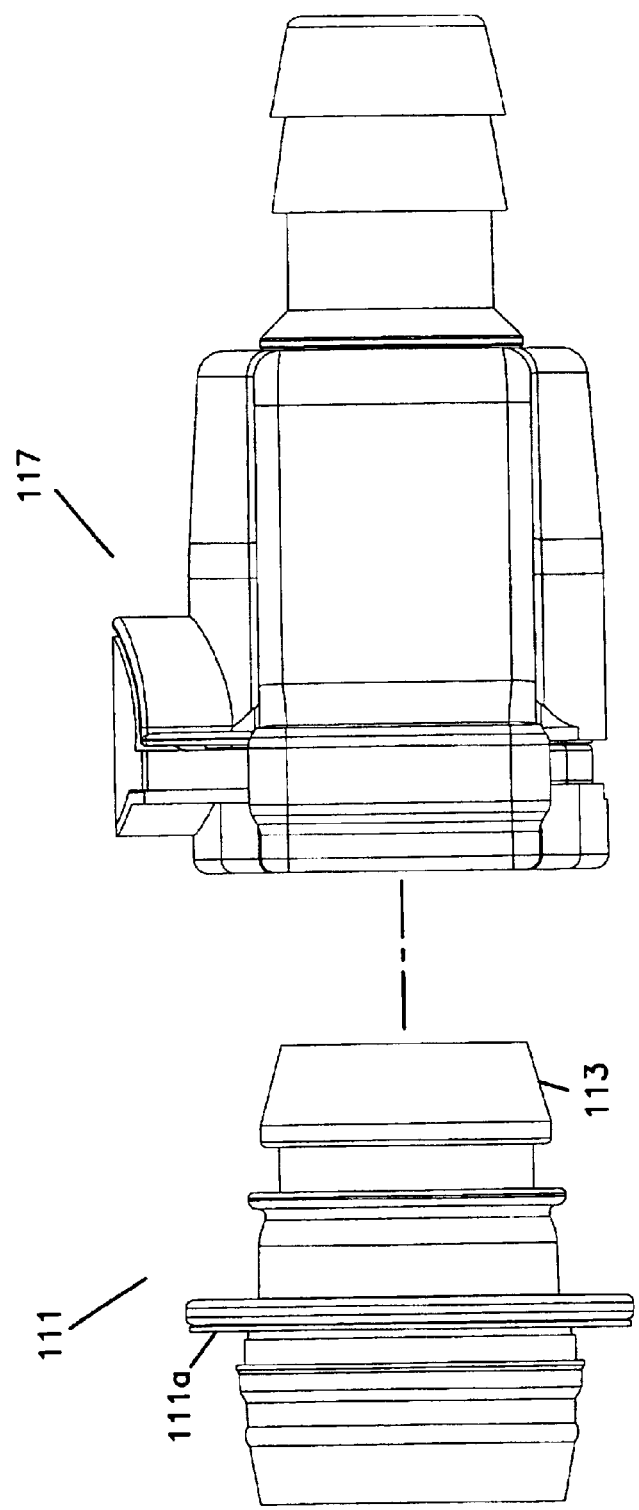
FIG. 5a represents a side view of the first coupler of FIG. 3 and the second coupler of FIG. 4 in one embodiment of a non-connected state in accordance with the principles of the present invention.
Figure 5B:
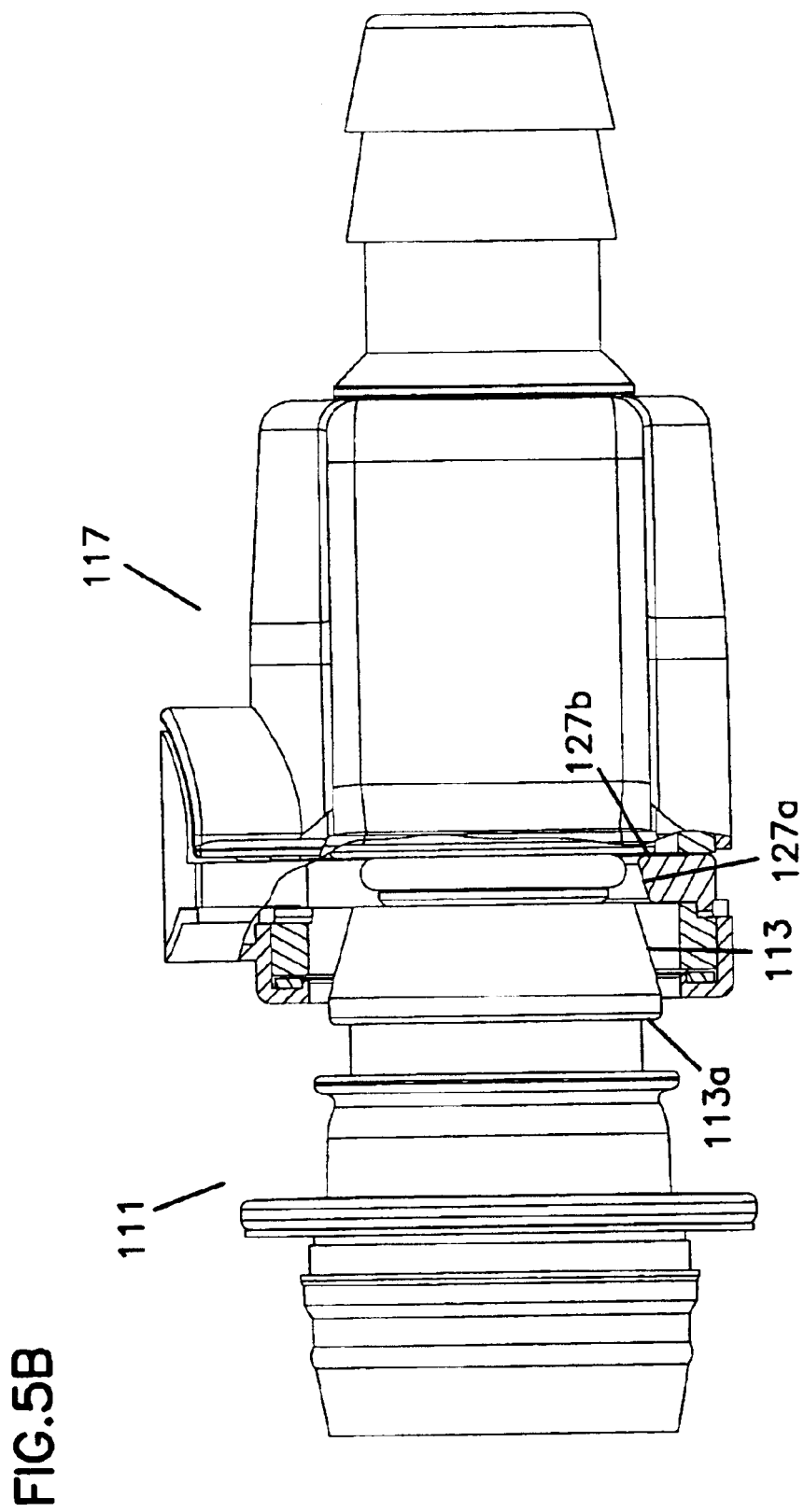
FIG. 5b represents a side view of the first coupler of FIG. 3 and the second coupler of FIG. 4 in one embodiment of a pre-coupled state.
Figure 5C:
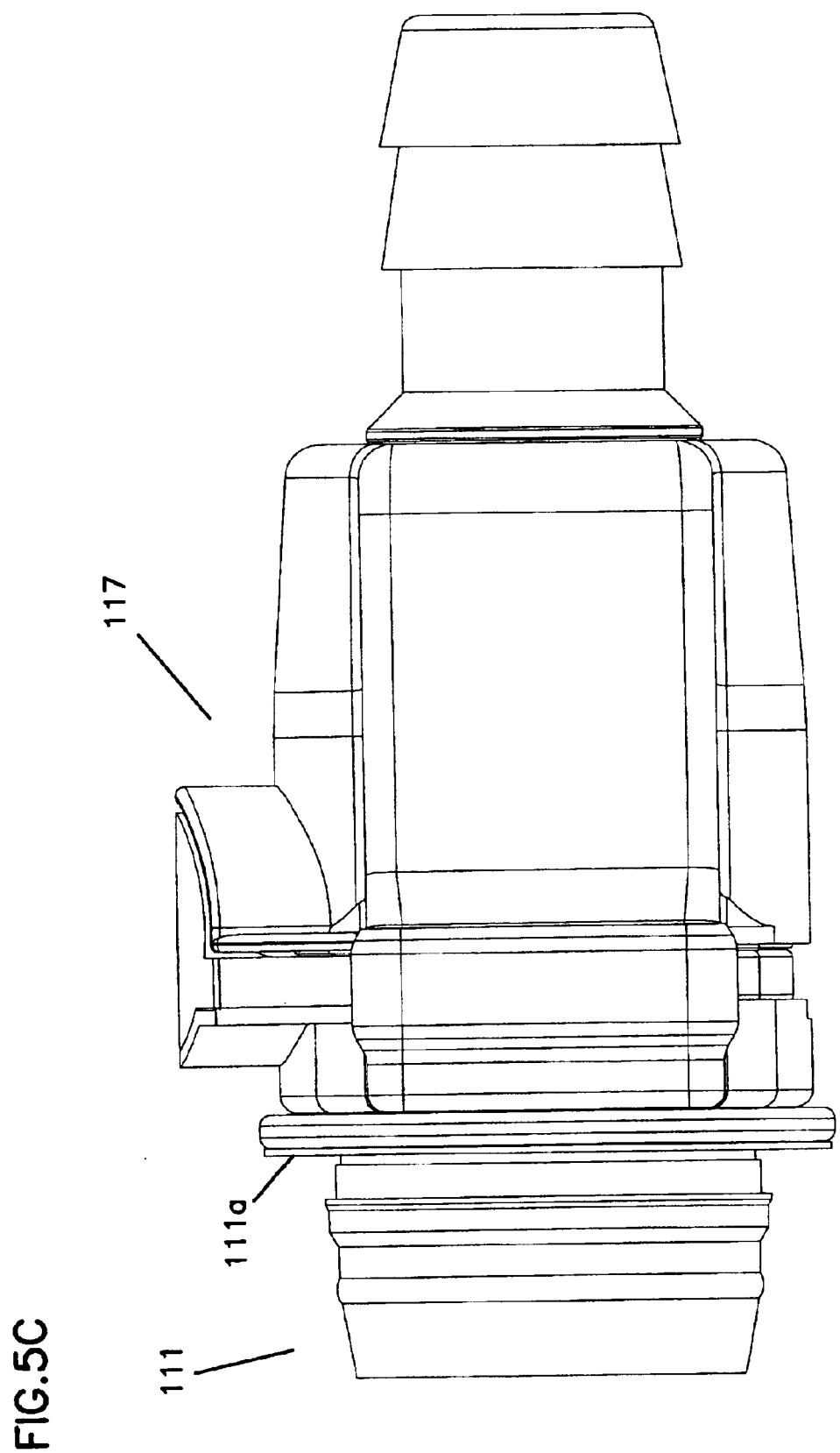
FIG. 5c represents a side view of the first coupler of FIG. 3 and the second coupler of FIG. 4 in one embodiment of a connected coupled state.

In one preferred example, the latch 127 includes a tapered surface 127a that may correspond and engage with a surface on a mating coupler, such as tapered surface 113 (FIG. 3). Further, the latch 127 may be spring biased such that by pressing the latch 127 downward the tapered surface 127a moves such that a mating coupler can be inserted. The tapered surfaces 127a, 113 are slidable relative to one another so as to allow the couplers to connect. After the tapered surfaces 127a, 113 have slid past each other, release of the latch 127 enables transverse surfaces 113a, 127b that are orthogonal to the respective tapered surfaces 113, 127a to abut and secure the coupling halves together (FIGS. 5a–5c). It will be appreciated that the tapered surfaces enable the couplers to simply be pushed together where pressing of the latch downward is not necessary. This configuration is one typical configuration for connecting quick connect/disconnect couplings. It will be appreciated that other configurations and structures may be employed for mounting the second transmitter 119 to the second coupler, and the configuration shown in FIG. 4 is merely exemplary.

FIGS. 5a–5c illustrate a first coupler 111 and a second reader coupler 117 being connected. FIG. 5a shows the first coupler 111 and second coupler 117 in a ready position for connection having the first transmitter 111a and second transmitter 119 (not shown) each mounted thereon. FIG. 5b illustrates one preferred embodiment of the pre-coupled position, described above, so as to enable communication between the transmitters on the couplers.

FIG. 5c illustrates the connected state of couplers 111 and 117, after positive connection has been confirmed during signal communication in the pre-coupled state. In operation, the second coupler 117 interrogates the first coupler 111 in determining whether a positive identification and proper connection is made. After positive identification has been confirmed, the couplers 111, 117 may be further engaged in the connected state (FIG. 5c) so as to continue further communication in manipulating a fluid control device, such as flow governing device to control fluid flow and fluid flow parameters thereof.

Figure 6:
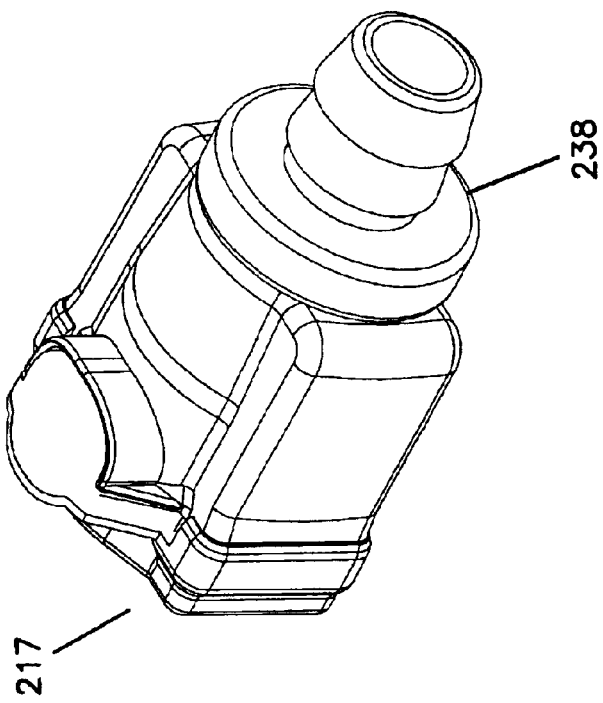
FIG. 6 represents a schematic view of one embodiment of a second coupler having a flow governing device incorporated therewith in accordance with the principles of the present invention.

FIG. 6 is a schematic illustrating a flow governing device 238 incorporated on the second coupler 217. This configuration enables control at the point of connection between the second coupler 217 and a first coupler, such as 11, 111. As above, it will be appreciated that the flow governing device may be any suitable device that may be enabled or disabled by the process equipment (22), for example an electromechanical device including but not limited to a solenoid, valve, or pump.

Figure 7A:
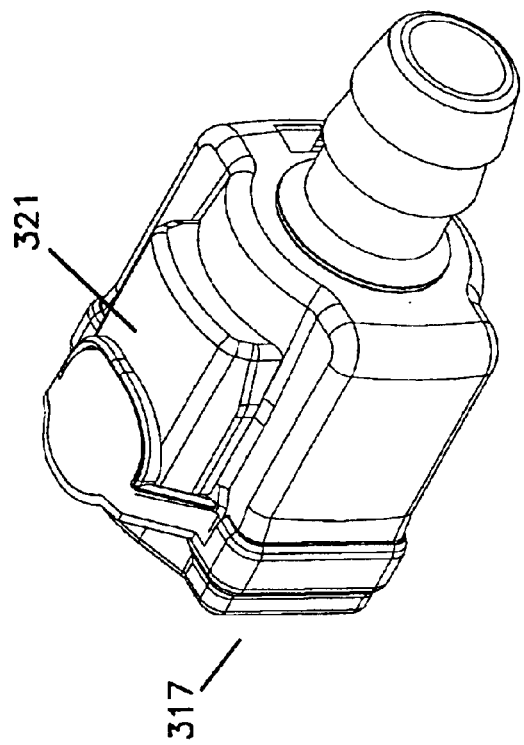
FIG. 7a represents a plan view of one embodiment of a second coupler having a lock out device incorporated therewith in accordance with the principles of the present invention.
Figure 7C:
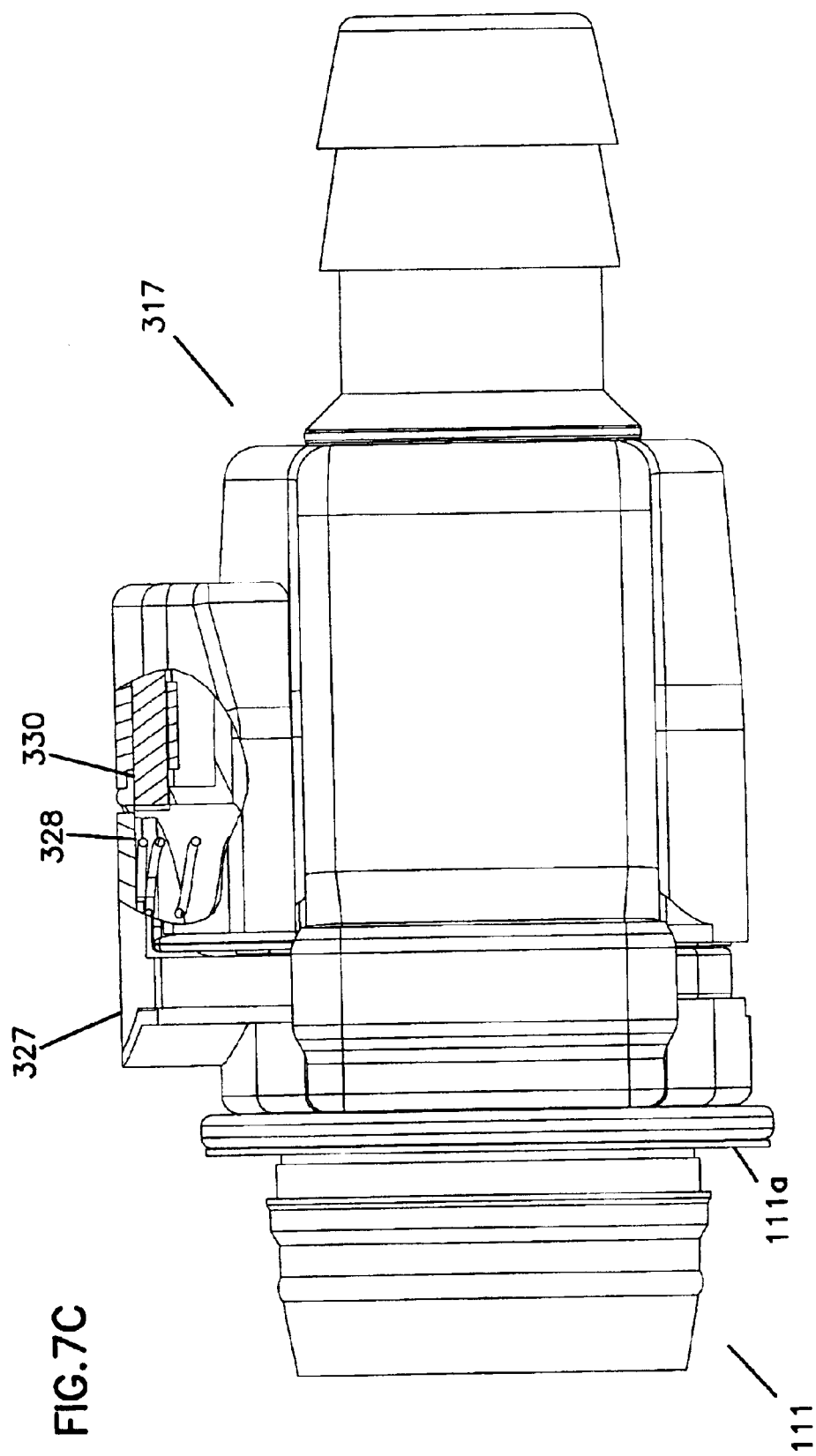
FIG. 7c represents a side partial sectional view of the second coupler of FIG. 7a having the lockout device incorporated therewith in an unlocked position.

In another embodiment, a lock out device 321 can be incorporated with the second coupler 317 to prevent misconnection of the couplers and interconnection between mismatched lines. FIGS. 7a–c illustrate one preferred embodiment of a lock out device 321. Preferably, the lock out device 321 may be directly controlled by the data communication module (26) or indirectly by the data communication module through the processing equipment (22), and is releasable when information from the communication between the first and second couplers indicates that interconnection therebetween is appropriate.

FIGS. 7b and 7c illustrate the lock out device 321 that includes a locking member 330 within the coupler 317 that is movable so as to release the function of the lock out device 321 when the second coupler 317 is in an initially locked out state. As shown in FIGS. 7b–7c the member 330 is in a locked position (FIG. 7b) where the locking member 330 connects to an under surface 328 of a latch 327. In this position, the second coupler 317 does not allow connection with the coupler 111. The latch 327 includes similar features as latch 127, and is not further described. FIG. 7c illustrates the locking member 330 in the unlocked position enabling connection between the first and second couplers 111, 317. Preferably, the lock out device 321 functions as a gate that prevents sealing surfaces of the first and second couplers to come in contact so as to avoid contamination of the couplers. More preferably, it will be understood the preferred communication distance between the couplers for releasing the lock out device 321 is equivalent to the distance between the couplers in the pre-coupled state when determining positive coupling connection.

This configuration can be helpful in industries where mixing of fluid lines presents a significant problem and safety hazard. For instance, mismatched lines containing certain products that are connected can result in contamination and subsequent loss of profit due to wasted product. Further, interconnecting mismatched electrical couplings can result in short circuits and circuit overload. The lock out device 321 avoids such misconnection by preventing connection between mismatched couplers and fluid lines.

It will be appreciated that both the flow governing device and the lock out device can be incorporated with the second coupler to both prevent misconnection and control fluid dispensing. Further, it will be appreciated that the flow governing device and lock out device may be used independently and controlled independently of each other. It also will be appreciated that the lockout and flow governing devices may be manually operated.

As stated above, advantages can be realized as the RFID tag is attached onto the coupler 11 and the data communication module 26 is mounted onto the cooperating coupler 17. For instance, the RF devices can communicate with each other when the couplers are in close proximity and positioned in a pre-coupled position. This configuration can allow for less power to be necessary for transferring signals, as well as the minimization of the possible outside interference during signal transfer. Yet another advantage of a close proximity RF system, and especially a short range reader circuit, is that circuitry normally necessary to detect and manage the simultaneous response of multiple RF signals emanating from individual tags may be eliminated.

Furthermore, the connector apparatus enables for reliable communication between the couplers, as the couplers are constructed and configured such that RF communication occurs when the couplers are in a pre-coupled position. A lock out device provides a structure so as to prevent misconnection between a reader coupler and an incorrect RF coupler thereby preventing contamination between mismatched lines. In addition, materials can be used that are both cost effective and simplified.

Furthermore, the present invention has been discussed toward the application of fluid coupling technology. It will be appreciated, the structure and configuration of the connector apparatus of the present invention also may be applied to and appropriate for other couplings, such as but not limited to electrical couplings and other quick connect/disconnect couplings.

Having described the embodiments of the present invention, modifications and equivalents may occur to one skilled in the art. It is intended that such modifications and equivalents shall be included with the scope of the invention.

We claim:

1. A connector apparatus, comprising:
   a first coupler including a first wireless transmitter attached to the first coupler; and
   a second coupler releasably connected with the first coupler, the second coupler including a second wireless transmitter attached to the second coupler;
   wherein the first and second transmitters of the first and second couplers are constructed and arranged to communicate when the first and second couplers are in a pre-coupled position defined by the first coupler being partially inserted into the second coupler; and
   wherein the second coupler is in communication with the first coupler when the first and second couplers are in a connected state.

2. The connector apparatus according to claim 1, wherein the first coupler is an RF coupler suitable for connection with a source, and the second coupler is a reader coupler suitable for connection with a line.

3. The connector apparatus according to claim 1, wherein the first and second couplers each include at least one antenna connected thereon to enable communication between the first and second couplers.

4. The connector apparatus according to claim 1, wherein the first wireless transmitter of the first coupler is an RFID tag, the RFID tag including coded information therein.

5. The connector apparatus according to claim 1, wherein the second wireless transmitter of the second coupler includes a reader circuit having a data communication module.

6. The connector apparatus according to claim 5, wherein the data communication module comprises:
   a first transceiver transmitting and receiving data from the first transmitter of the first coupler, the first transceiver being operatively connected with a second transceiver, the second transceiver transmitting and receiving data from the first transceiver and transmitting data to and from processing equipment;
   a microcontroller operatively connected with both the first and second transceivers, the microcontroller establishing and controlling communication between the first transceiver and the second transceiver; and
   an DC/DC converter, the DC/DC converter providing a power supply.

7. The connector apparatus according to claim 6, wherein the first transceiver operates at a frequency of at least 13 MHz in communicating with the first transmitter of the first coupler.

8. The connector apparatus according to claim 6, wherein the first transceiver is a circuit operating in a range less than 5 cm in communicating with the first transmitter or the first coupler.

9. The connector apparatus according to claim 1, wherein the pre-coupled position is defined by the first coupler being oriented and positioned at least partially engaged with the second coupler and the first coupler and the second coupler resembling a one to one relationship at a single time such that the second coupler is prevented from connecting and communicating with another coupler unless the first coupler is removed from the pre-coupled position.

10. The connector apparatus according to claim 1, wherein the first and second couplers are electrical couplers.

11. The connector apparatus according to claim 1, wherein the first and second couplers are fluid couplers.

12. A coupler, comprising:

a body including first and second ends defining an opening longitudinally therethrough; and an RFID tag mounted on the body, the RFID tag enabling RF signal transmission to and from the RFID tag, the RFID tag being constructed and arranged such that communication is enabled with a piece of equipment when the body is at least partially engaged with the piece of equipment in a pre-coupled position, the pre-coupled position being defined by the body being partially inserted into the piece of equipment.

13. The coupler according to claim 12, wherein the coupler is an electrical coupler.

14. The coupler according to claim 12, wherein the coupler is a fluid coupler.

15. A reader coupler, comprising:

a body including first and second ends defining an opening longitudinally therethrough; and a reader circuit mounted on the body, the reader circuit enabling signal transmission to and from the reader circuit and interrogation of a mating coupler with transmitter in determining a positive connection, the reader circuit being constructed and arranged such that interrogation is enabled with the mating coupler when the body is at least partially engaged with the mating coupler in a pre-coupled position, the pre-coupled position being defined by the body being oriented and positioned where the mating coupler is partially inserted into the reader coupler.

16. The reader coupler according to claim 15, wherein the reader coupler is an electrical coupler.

17. The reader coupler according to claim 15, wherein the reader coupler is a fluid coupler.

* * * * *